US007323643B2

United States Patent
Hjálmarsson

(10) Patent No.: US 7,323,643 B2
(45) Date of Patent: Jan. 29, 2008

(54) IN-FEED CONTROL AND DISPERSION APPARATUS FOR FRESH FOOD

(75) Inventor: Helgi Hjálmarsson, Kapavogur (IS)

(73) Assignee: Valka Ehf, Kopavogur (IS)

( * ) Notice: Subject to any disclaimer, the term of this patent is extended or adjusted under 35 U.S.C. 154(b) by 0 days.

(21) Appl. No.: 10/571,752

(22) PCT Filed: Sep. 10, 2004

(86) PCT No.: PCT/IS2004/000014

§ 371 (c)(1),
(2), (4) Date: Mar. 13, 2006

(87) PCT Pub. No.: WO2005/023686

PCT Pub. Date: Mar. 17, 2005

(65) Prior Publication Data

US 2007/0039763 A1 Feb. 22, 2007

(30) Foreign Application Priority Data

Sep. 11, 2003 (IS) ......................................... 6949

(51) Int. Cl.
*G01G 19/387* (2006.01)
*G01G 13/00* (2006.01)
*G01G 19/393* (2006.01)
*G01G 11/00* (2006.01)
*B65G 25/02* (2006.01)

(52) U.S. Cl. .................. 177/25.18; 177/105; 177/119; 177/120; 177/121; 222/77; 198/718; 198/752.1

(58) Field of Classification Search ........ 177/105–123, 177/25.18; 222/55, 56, 77; 198/752.1, 718, 198/722, 725
See application file for complete search history.

(56) References Cited

U.S. PATENT DOCUMENTS

| 3,561,552 A | * | 2/1971 | Rischke ...................... 177/120 |
| 4,122,941 A | | 10/1978 | Giles et al. |
| 4,398,612 A | | 8/1983 | Mikami et al. |
| 4,561,510 A | | 12/1985 | Sugioka et al. |
| 4,564,103 A | | 1/1986 | Sakaeda et al. |
| 4,570,831 A | | 2/1986 | Fukuda et al. |
| 4,600,096 A | | 7/1986 | Yamano et al. |
| 4,619,359 A | | 10/1986 | Kennedy, Jr. et al. |
| 4,662,508 A | | 5/1987 | Inoue et al. |
| 4,708,215 A | * | 11/1987 | Nakamura et al. ........ 177/25.18 |
| 5,613,595 A | | 3/1997 | Ukada |
| 6,444,926 B1 | * | 9/2002 | Ricciardi, Sr. ............... 177/16 |
| 6,493,605 B1 | | 12/2002 | Prideaux et al. |

FOREIGN PATENT DOCUMENTS

GB        242848      11/1925

* cited by examiner

*Primary Examiner*—Randy W Gibson
(74) *Attorney, Agent, or Firm*—Venable LLP; Robert Kinberg; Marina V. Zalevsky

(57) ABSTRACT

This invention relates to an in-feed control and dispersion apparatus, in the field of fresh food product industry. The apparatus receives a product from an in-feed device and delivers it to one or more receiver units. The apparatus includes a first product dispersion device, a weighing device and a second product dispersion device. Each first and second product dispersion device includes a base structure with a multiple through holes or slots, through which one or more associated moveable protruding structures move. During use of the apparatus, the top surface of the protruding structure is never moved lower than the bottom surface of the base structure.

14 Claims, 4 Drawing Sheets

IN-FEED CONTROL AND DISPERSION APPARATUS FOR FRESH FOOD

TECHNICAL FIELD

The invention relates to an in-feed control and dispersion apparatus and a method, in the field of fresh food product industry, and more particularly in the field of fish and poultry food industries, where the apparatus by executing the method receives product from an individual in-feed device, typically from bulk, and delivers it to a receiver unit of any kind.

The apparatus revolutionises the in-feed and handling of the fresh products, more particularly the fresh, delicate and sticky ones, over to diverse receiver units, such as freezers of many kind, combination weighers etc. These products are typically fed manually to these units today and then it is very difficult to control the throughput accurately and it is very labour intensive. Additionally manual handling of these products is not desirable due to food safety issues, and food processor strive therefore towards more automation.

BACKGROUND ART

Various dispersing devices are available. Most of them are based on vibration of some sort and are designed for automatic weighing systems, most commonly combination weighers. A combination weigher is designed to make groups of product, weights of which are to be as close as possible to a predetermined weight. Typically there is a target weight, which must be matched or exceeded with minimum over-weight. A combination weigher receives product in bulk from some infeed device and disperses the product to several pool hoppers, each of which is above a weighing hopper. The amount of product collected in each pool hopper is usually significantly less than the target weight, e.g. ¼-⅛ of the target weight. The product is released from the pool hoppers and into the weighing hoppers where it is weighed. The controller of the combination weigher will then calculate the optimum combination of the weighing hoppers such that their combined weight is exactly the target weight or as little above it as possible. The combination weigher then releases the product from these hoppers into an outlet trough or on an outlet conveyor. After each drop, the hoppers, which were emptied, are filled again from their respective pool hoppers and the pool hoppers are filled by activating the section of the dispersion device leading to that hopper. There are mainly two types of combination weighers; either the weighing hoppers are ranged circularly about a common axis or they are in linear arrangement. In the former type the dispersion device is located in the centre of the circular array of the weighing units. The product fed to its central portion is dispersed in the radial direction and supplied to the pool hoppers. In the latter type, the dispersion device is behind the weighing hoppers and the product is fed to the inlet-end of the dispersion device while the outlet is next to the weighing hoppers. In both cases the functionality is essentially the same. Combination weighers do not always have one pool hopper above each weighing hopper. The product in the pool hoppers can be weighed such that better control is achieved of the weight of each product group accumulated in the pool hopper before it is released to the weighing hopper. There can also be multiple pool hoppers above each of the weighing hopper to ensure quicker filling of the weighing hoppers. That is especially useful if the dispersion device does not reliably feed product when activated. Yet another variation is to have a pool hopper underneath the weighing hopper such that the product in the weighing hopper can either be released to the outlet trough or into the pool hopper. This gives the controller more possible combinations as the weight of the product in the pool hoppers underneath the weighing hoppers is known. More possible combinations will on average lead to better performance of the combination weigher, that is lower over-weight or more capacity.

Combination weighers are well known but being able to use them reliably on fresh, sticky and delicate food products has been the problem up to know.

Several patents exists for dispersion devices. One of the first patents for an automatic weighing device with a dispersion device as a critical component is U.S. Pat. No. 4,398,612. Another, newer patent, which also describes a dispersion device to disperse product to a circular array of weighing hoppers is U.S. Pat. No. 4,561,510. Similar device has also been patented in U.S. Pat. No. 4,600,096. These patents have in common that there are multiple dispersion devices which operate on the same pile of products and they can be individually controlled and thus used to selectively feed multiple weighing hoppers or pool hoppers above weighing hoppers. Most of these devices are designed for firm non-sticky product but some attempts have been made to make dispersion devices for sticky products that can not be conveyed by vibration. One example is U.S. Pat. No. 4,662,508 where rotating discs in an horizontal plane are used to disperse the product Another example is U.S. Pat. No. 6,493,605 where e.g. flexible tabs and vertical movement of the inlet chute are used to obtain more uniform feeding on the dispersion tables. These feeding devices have that in common that they are not gentle enough on delicate food products and can therefore not be used for the problem at hand.

Another feeding device along with a weighing unit has been patented in U.S. Pat. No. 4,122,941. Although this device is mechanically somewhat similar to the dispersion unit of the present invention it is neither an in-feed control nor a dispersion device. This unit is designed to be manually fed and the feeding mechanism is designed to selectively shift individual product items from one slot to the next. It is also not ensured that the stationary carrier bars are sufficiently thick that the top part of the moveable bars will never go beneath the lower part of the stationary carrier bars. This means that the tail of a fresh fish fillet which can easily slide between the carrier bars could get cut or damaged.

A feeding device similar to the one described here above is designed to feed fruit products to a fruit grading machine has been patented in U.S. Pat. No. 5,613,595. Again this is not an in-feed control apparatus as the amount of product being fed can not be accurately controlled. Furthermore is it not ensured that the stationary carrier members are sufficiently thick that the top part of the moveable carrier member will never go beneath the lower part of the stationary carrier member. Delicate food product which can slide between the stationary carrier member can therefore get cut or damaged.

In the light of the foregoing it is clear that there still remains a need for more suitable automatic apparatus to feed and handle fresh, sticky and delicate food products, especially where accurate control of the throughput is needed.

DISCLOSURE OF THE INVENTION

The object of the invention is therefore that of presenting an apparatus and a method as here is disclosed to feed precisely and accurately fresh, sticky and delicate food products, particularly in the field of fish and poultry industries.

The in-feed control and dispersion device is designed to receive a pile of product in one location, called inlet region, and disperse it such that a sequence of smaller piles of product flow out at another location, called outlet region which could be one or more in the device. The product is said to move forward when it moves from the inlet region to an outlet region. The device has a base structure, commonly a plate, on which a pile of the product to be dispersed sits. The base plate has several through holes and typically it is horizontal but it could also be under an angle. Through the holes in the base plate move protruding structures, which could be vertical plates, in an cyclic movement, which would typically be a circular movement. One plate moves through each of the holes in the base plate, these plates can be connected and move therefore together or they could be disjoint to be able to selectively move product in given region of the base plate. When the plate moves up and forward through the holes in the base plate it lifts up the product sitting on the base plate and moves it forward. The speed of this movement can be controlled to determine the speed of the feeding. It is important to keep the volume or weight of the product pile fairly steady and the dispersion device is thus equipped with some means to measure the volume or the weight of the pile, e.g. with a proximity sensor or with some weighing means, for example a load-cell.

The novel invention, which is an unique in-feed control and dispersion device, consists of two dispersers and a revolving drum scale between them. The first disperser distributes the product for the scale and the second one dispersed even better and the machine can precisely control the product flow.

BRIEF DESCRIPTION OF THE DRAWINGS

FIGS. 3(a) and 3(b) show two possible jagged surfaces, 3(c) shows how pins or sharp objects can be attached to the top surface and 3(d) shows how vacuum can be lead to the top surface.

MODES FOR CARRYING OUT THE INVENTION

Figure 1:
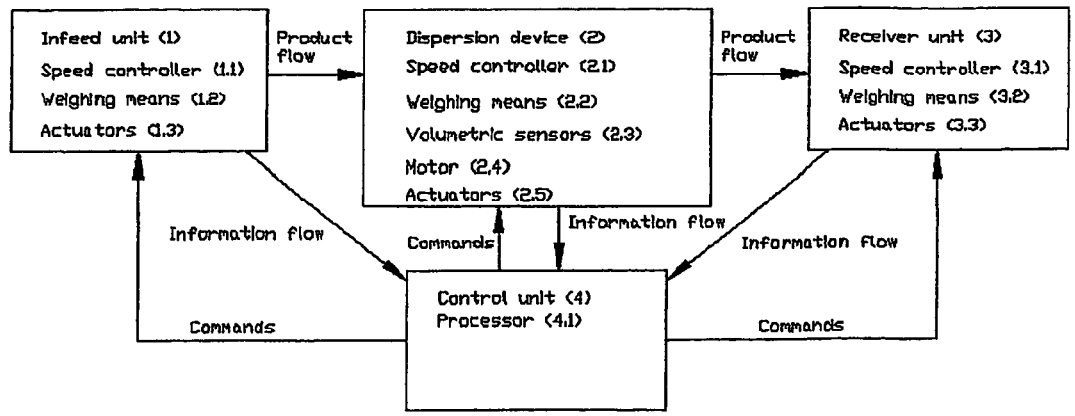
FIG. 1 shows a block diagram of possible configuration of the dispersion device with respect to how it is controlled and how it connects to other devices, namely the in-feed device and the receiver device.

FIG. 1 shows a box diagram with the invention and how it connects to sensors and other devices. Item (1) is an in-feed unit, which would typically be a conveyor but it could also be a weighing hopper or any other device capable of feeding product. Item (2) is the dispersion unit which can have a weighing means (2.2) for weighing the prod to be dispersed and volumetric sensors (2.3), e.g. a proximity sensor, for estimating the volume or only the height of the product pile. It has also a driving mechanism, typically a motor (2.4) and a speed controller (2.1) to control the speed of the motor. There is also a control unit (4) which would typically be part of the dispersion unit but it could as well be fully independent or part of the infeed unit or part of the receiver unit which would be the case if the receiver unit is a combination weigher. The control unit would typically be equipped with a processor which is capable of processing the information received from any of the sensors or the weighing means. It is programmable and the program will react on the information received by sending commands to any of the components in the in-feed unit (1), the dispersion unit (2) or the receiver unit (3). The receiver unit (3) for the dispersed product can be a conveyor, a weighing hopper, some sort of a trough or a divider which would for example divide the product between two or more weighing hoppers. The receiver unit can be equipped with a weighing means (3.2) or some other device which could give feedback to the control unit (4) about the dispersion process. The weighing means (2.2), the volumetric sensors (2.3) and the speed controller(2.1) of the dispersion unit (2) are all connected to the control unit. The feedback from the receiver unit (3) could be used for example to maintain consistent flow rate out of the dispersion device (2). The control unit can use the weighing means (3.2) to measure the flow rate and change the speed setting on the speed controller (2.1) on the dispersion device if the flow rate deviates from the preset target value.

Although FIG. 1 shows only one in-feed unit, one dispersion unit and one receiver unit, there could be several of each of these units in one configuration, where all the units would be connected to the same control unit. Typically for a combination weigher application, there will be only one in-feed unit but several dispersion units and receiver units. The dispersion units in a combination weigher application would typically be connected to the same driving mechanism. In another application, where the quality of the dispersion is critical, it is possible to have more than one dispersion unit, one after another, to obtain better dispersion.

Figure 2:
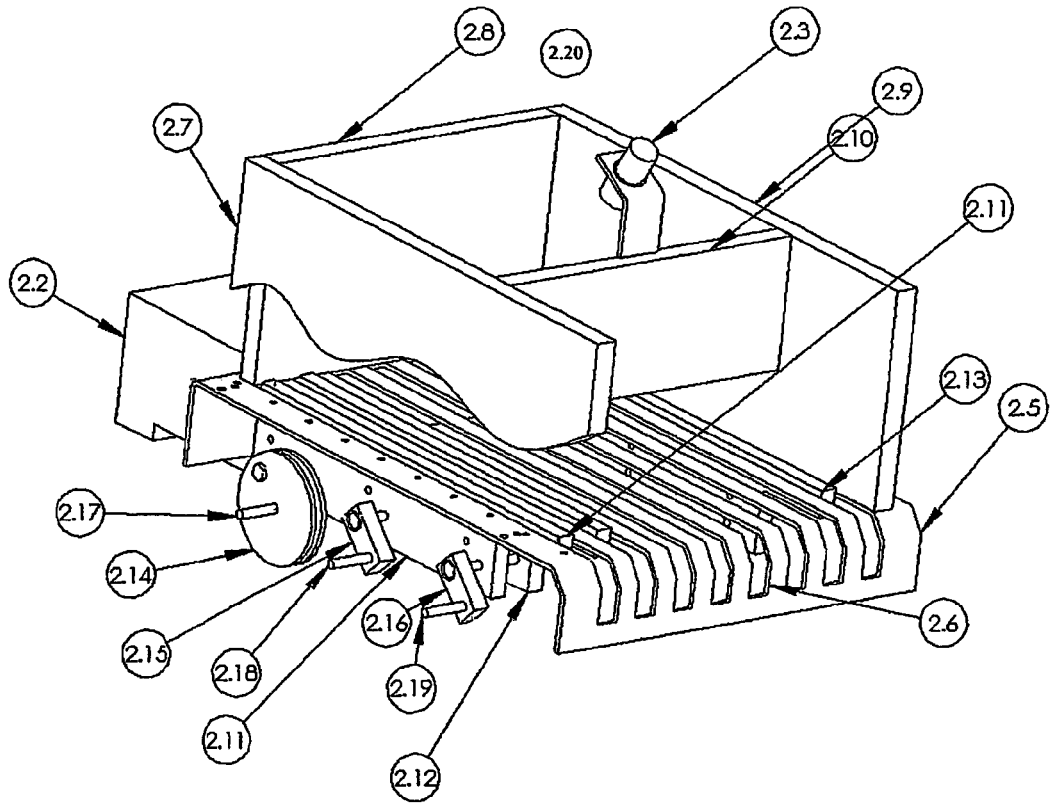
FIG. 2 shows an overview of the dispersion device and most of its critical components.

FIG. 2 shows an overview of the preferred embodiment of the dispersion unit. The base structure is a plate (2.5) which has several through holes (2.6) and the product—not shown on the picture—sits on this plate. Typically the through holes are smaller than the product such that the product does not fall through these holes. Another method to avoid product from falling through the holes on the base plate is to have the base plate sufficiently thick such that the top surface of the protruding structures will be above the bottom surface of the base plate throughout the cyclic movement. Ensuring this will also minimize the change of damaging the product which slides into the through holes, which otherwise might get cut or stuck between the bottom surface of the base plate and the top surface of the protruding structures. The base structure could as well be a grate made of e.g. steel bars which would have the same function. To facilitate cleaning of the device the base plate can be hinged on any one of its sides or be easily removable, thus ensuring good access to the protruding structures. To avoid the product falling off of the base plate, there are supporting walls on three sides extending from the base plate (2.7, 2.8, 2.9) and also one supporting plate (2.10) in front which is elevated from the base plate to allow the product to move underneath it. This plate prevents the product pile to move too rapidly forward and it could be vibrated or linked to the cyclic movement of the protruding structures to assist in breaking up the product pile.

Attached to the supporting plate (2.10) is a proximity sensor (2.3) which can give signals when the product pile on the base plate is lower than a preset level and also when it is higher than another preset level. The control unit (4)—only shown on FIG. 1—can set an in-feed unit (1)—only shown in FIG. 1—running when the pile is lower than the lower preset level and stop it when the product pile is above the higher preset level. The same functionality can be obtained by having the base plate on some weighing means (2.2). Then the in-feed unit would be started when the weight on the base plate is less than a preset limit and stopped when the weight is above another preset limit. The control unit (4) could also seek to maintain constant height of the product pile or the weight of the product sitting on the base plate (2.5) by controlling the speed of the in-feed unit via the speed controller of the in-feed unit (1.1), instead of starting it and stopping as described above.

To move the product forward, a protruding structure (2.11), which is a plate in this preferred embodiment, is moved up through the through holes (2.6) in the base plate (2.5) and then forward in some sort of cyclic movement in a vertical or close to vertical plane. Multiple plates (2.11, 2.12) can be connected and moved together or they can be disconnected and controlled individually, e.g. plate (2.13) could be disconnected from plates (2.11) and (2.12) and moved independently of these plates. The purpose of moving the plates individually is to be able to selectively disperse product from given regions of the base plate (2.5). In the preferred embodiment, all the plates (2.11-2.13) are connected together and there would also be five more plates connected to them protruding through the through holes (2.6) in the base plate (2.5) although they have been omitted in the drawing for clarity purposes.

Figure 3:
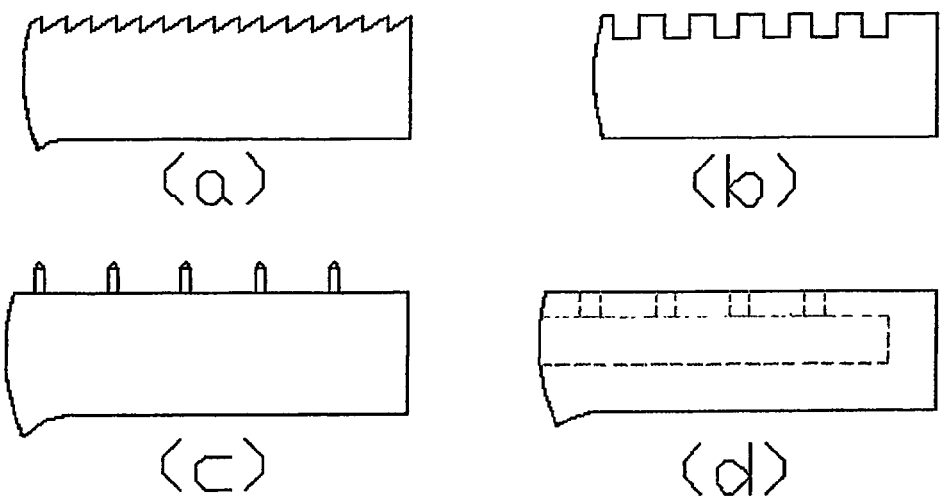
FIG. 3 shows four possible methods to obtain better grip on the product with the protruding structures.

The top surface of the protruding plates (2.11-2.13) is of particular importance since it will control how well the plate is able to move the product forward. In FIG. 3 are shown several different alternatives of the top surface. FIGS. 3(*a*) and 3(*b*) show two possible variation of jagged top surface. FIG. 3(*c*) shows how pins, knives or any sharp objects can be fastened to the top surface of the protruding structures. The pins can be used to give higher friction to the product or they can stick into the product. Yet another possibility is to use vacuum to fasten the product sitting on the base plate (2.5) to the protruding structures. FIG. 3(*d*) shows an internal channel extending in the longitudinal direction of the protruding structure and leading at multiple locations to the top surface such that vacuum from one source can act throughout the protruding structure. The vacuum can be selectively operated such that it will be turned on when the top surface of the protruding structure goes above the top surface of the base plate (2.5) and turned off when it goes below it. Vacuum can for example be used for very sticky product and then the base plate (2.5) would typically be under significant angle from a horizontal plane, leaning backwards, to help in moving the product sitting higher in the product pile backwards. When the base plate is under a significant angle it can be important to prevent the product from sliding backwards on the base plate while the protruding structures are below the surface of the base plate. The surface of the base plate can thus be made such that it has high friction to the product and for example be as shown in FIG. 3(*a*), 3(*b*) or 3(*c*).

To generate the cyclic movement of the protruding plates (2.11-2.13) there must be a driving mechanism connected to the supporting mechanism of the plates. The supporting mechanism for the protruding plates can be made in several ways. FIG. 2 shows the preferred support for the plates. The protruding plates (2.11) and (2.12) are connected together and are fastened at three locations, in one location to a wheel (2.14) and at the other two to a rod (2.15, 2.16). The wheel and the rods are fastened to the frame (not shown on picture) of the device with bolts (2.17-2.19) and can rotate freely around these bolts. Typically there would be bearings, although not shown in drawing, around the fasting bolts (2.17-2.19) to facilitate the rotation. The protruding plates (2.11-2.13) could be fastened at only two location if it is ensured that the rod (e.g. 2.16 if 2.15 is omitted) will always rotate in the right direction and the plates could be fastened at more than three locations if more support is needed. In most cases it will be sufficient to connect the driving mechanism to only one wheel (2.14) but also possible is having more than one wheel driven.

Figure 5:
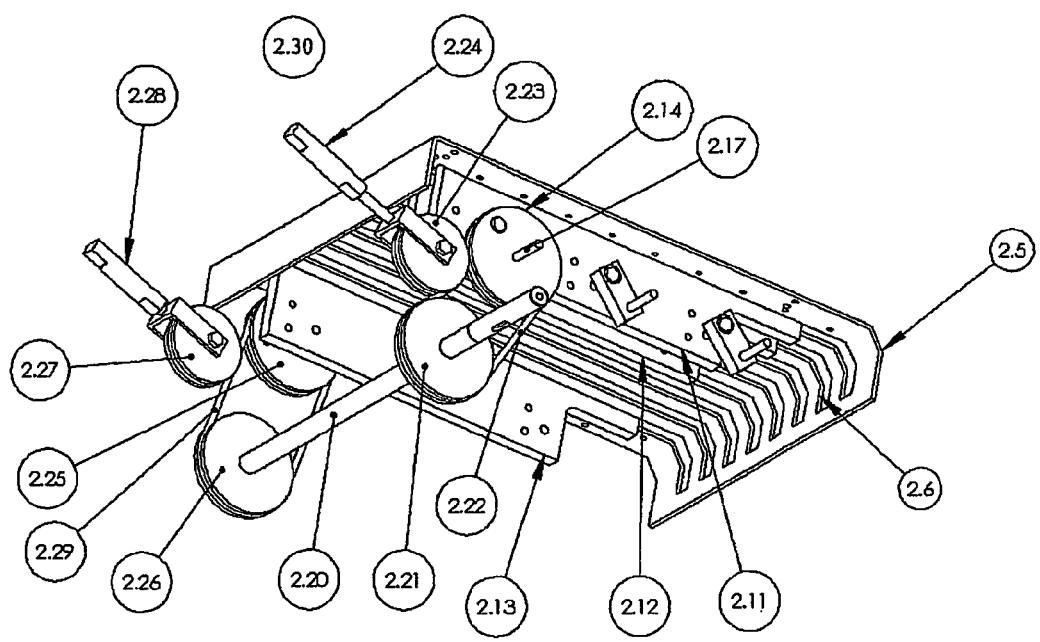
FIG. 5 shows an embodiment of a in-feed control and a dispersion machine

In FIG. 5 is shown the preferred configuration of the driving mechanism of the wheel. The driving shaft (2.20) is connected to a motor (not shown in drawing) and the driving wheel (2.21) is connected to this shaft. The wheel (2.14) attached to the protruding structure (2.11) is connected to the driving wheel (2.21) with some sort of a belt (2.22). If needed, there could be a tightening wheel (2.23) for the driving belt When the motor is running the shaft (2.20), the driving wheel (2.21) and the wheel (2.14) rotate. As the wheel (2.14) is attached to the protruding structure (2.11) it will encounter a rotational movement around the fastening bolts (2.17-2.19) and thus move the bottom part of the product pile (not shown on drawing) sitting on the base plate (2.5) forward, that is from left to right on FIG. 5. In the preferred embodiment all the protruding plates (2.11-2.13) will be connected and there would also be five more plates between these plates to protrude through the remaining through holes in the base plate (2.5) although omitted in the drawing.

Figure 4:
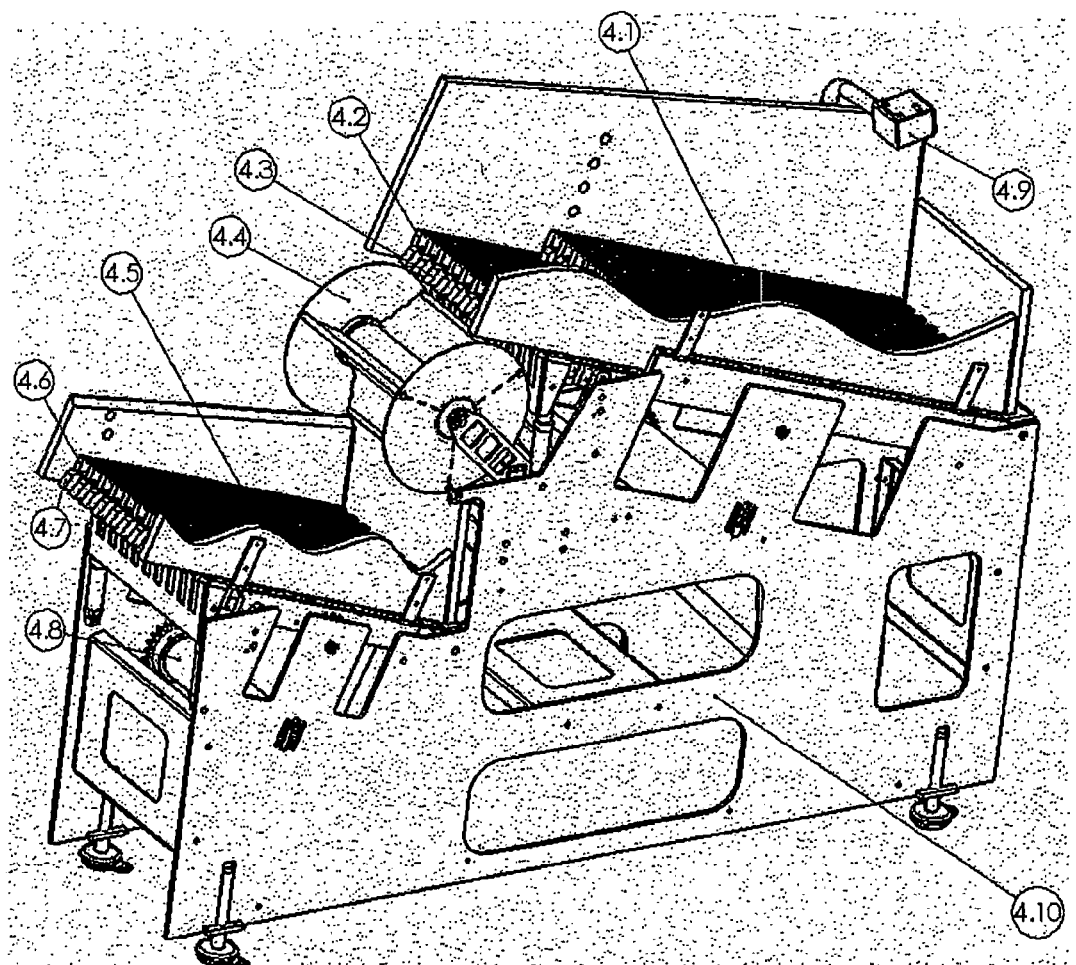
FIG. 4 shows an overview of the driving mechanism of the dispersion device.

In FIG. 4 is shown an unique in-feed control and dispersion apparatus (4.10) which consists of two dispersers (4.1 and 4.5) and in between them is a weighing unit (4.4), preferably a revolving drum scale. The first disperser (4.1) is equipped with a product sensor (4.9) which maintains a continuous quantity of product in the unit by selectively starting and stopping an in-feed device (not shown on drawing), so ensuring a continuous flow of pieces onto the weighing unit. When the weighing unit (4.4), has obtained the right amount of product, feeding from the first disperser is stopped. Then the weight is determined precisely before the drum scale is rotated such that the product from the scale is released in to the second disperser (4.5). The second disperser then distributes them evenly onto a receiver unit (not shown on drawing), typically a conveyor, thereby ensuring that the product is very evenly spread on the receiver unit. The main purpose of this unique apparatus is to obtain a consistent flow of product where the throughput rate can be controlled very precisely, e.g. 1000 kg/hour. This is obtained by determining the release time from the scale based on the weight of the previous release and the desired throughput. E.g. if the desired throughput rate is 1000 kg/hour and the weight of the last release was 2 kg, the next release will take place after (2 kg/1000 kg/hour)*3600 s/hour=7.2 s. The individual batch weight is selected sufficiently high such that the throughput can be maintained based on the speed of the scale and is kept as low as possible to obtain optimum dispersion.

To optimize the distribution of pieces on to the receiver unit the speed on the second disperser (4.5) is changed based on the weight of the last pile being released onto the disperser and on predetermined measurement of the spread of the pile being released on the second disperser The spread of the pile is measured as a function of the weight of the pile and can also be linked to the product type being processed.

In many instance, e.g. when using the dispersion apparatus (4.10) for feeding an automatic weighing device, for example a combination weigher, multiple dispersion devices are needed to be able to selectively feed product to the hoppers which were emptied in the previous selection. It is of economical importance to use only one driving means, e.g. a motor, in such instances. On FIG. 5 there are two separate protruding structures, plates (2.11) and (2.12) are connected and form one structure and plate (2.13) forms another. The same driving shaft (2.20) is used to rotate both of these structures but the structures will only rotate if the tightening wheels (2.23, 2.27) are pushed against their respective driving belts (2.22, 2.29). Actuators (2.24, 2.28), typically air activated cylinders, which are attached to the frame (not shown on drawing) of the unit, are used to push the tightening wheels against the driving belts. The actuators are separately operated and can thus be used to selectively rotate the protruding structures. It can be seen on FIG. 5 that the protruding structure, which consists of plates (2.11) and (2.12), would rotate, as their actuator (2.24) is extended out and the tightening wheel (2.23) is pushed against the driving belt (2.22). On the other hand the plate (2.13) will not rotate although its driving wheel (2.26) rotates as the tightening wheel (2.27) is not pushed against the driving belt (2.29). Although there are only shown two separate protruding structures in this drawing there can be any number of such structures connected to the same driving mechanism. These structures can have linear arrangement as shown on FIG. 4 but they can as well be have circular arrangement around a common axis as is needed for a combination weigher with its weighing hoppers in such an arrangement. Any other arrangement of the dispersion devices which proves to be practical is also possible.

Figure 6:
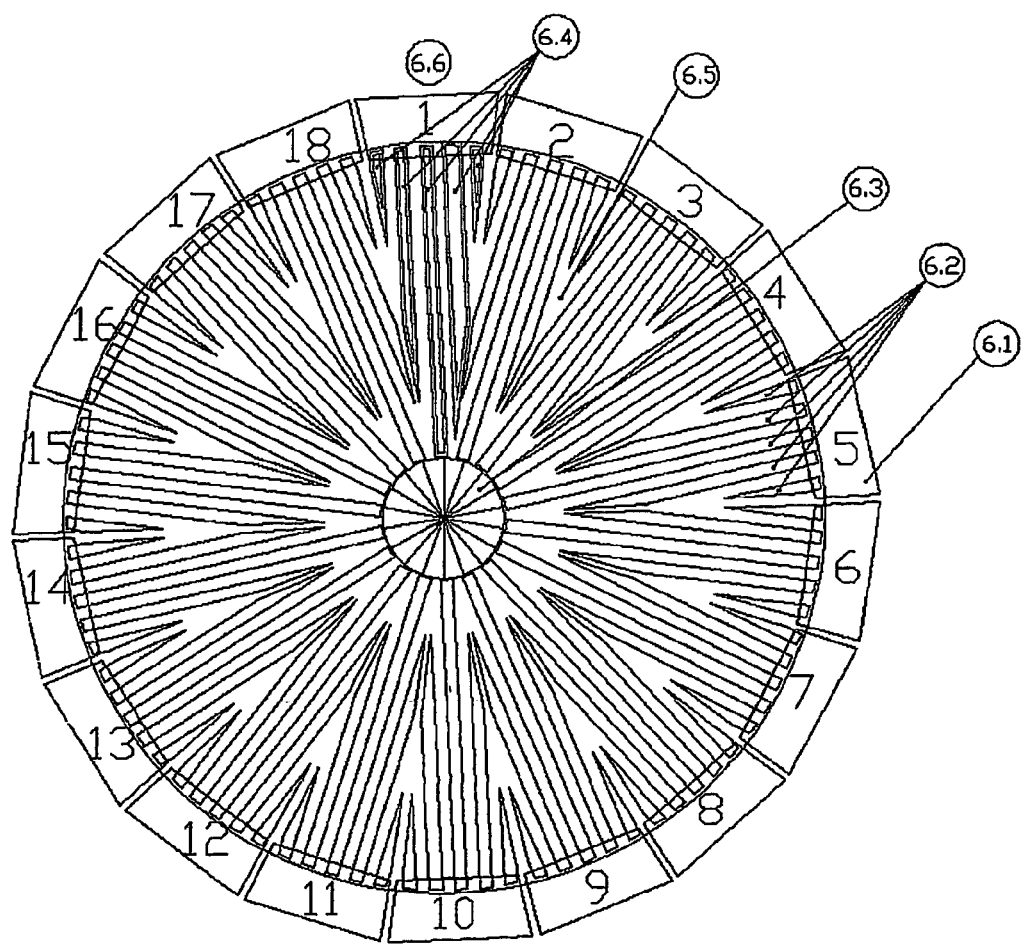
FIG. 6 shows an embodiment of the dispersion device for a combination weigher with its weighing hoppers arranged in a circular array around a common axis.

In FIG. 6 is shown a possible construction of a base structure (6.5) in a dispersion device for a combination weigher (6.6) with the weighing hoppers in a circular array. This combination weigher has eighteen pool hoppers (6.1) and eighteen weighing hoppers (not shown on figure) underneath each of the pool hoppers. The protruding structures (6.4), which protrude through the slots (6.2) in the base structure (6.5) leading to each pool hopper, can be selectively activated to feed the hoppers which were emptied in the previous selection. The center cone (6.3) is static steep cone but it can also be a rotating disc or another dispersion device, including the one here being patented. Thus it can be sitting on a weighing means used to give feedback to the control unit which would seek to maintain constant weight of the pile sitting on top of it This dispersion device could be driven with only one motor and have a sequence of shafts connected with a universal joint in a circular path. Then there would be eighteen actuators which could be selectively activated and thus pushed on a driving belt for each of the eighteen separate protruding structures of the dispersion device in the same manner as shown on FIG. 5. Another option is to have individual driving mechanisms for each of the protruding structures.

Figure 7:
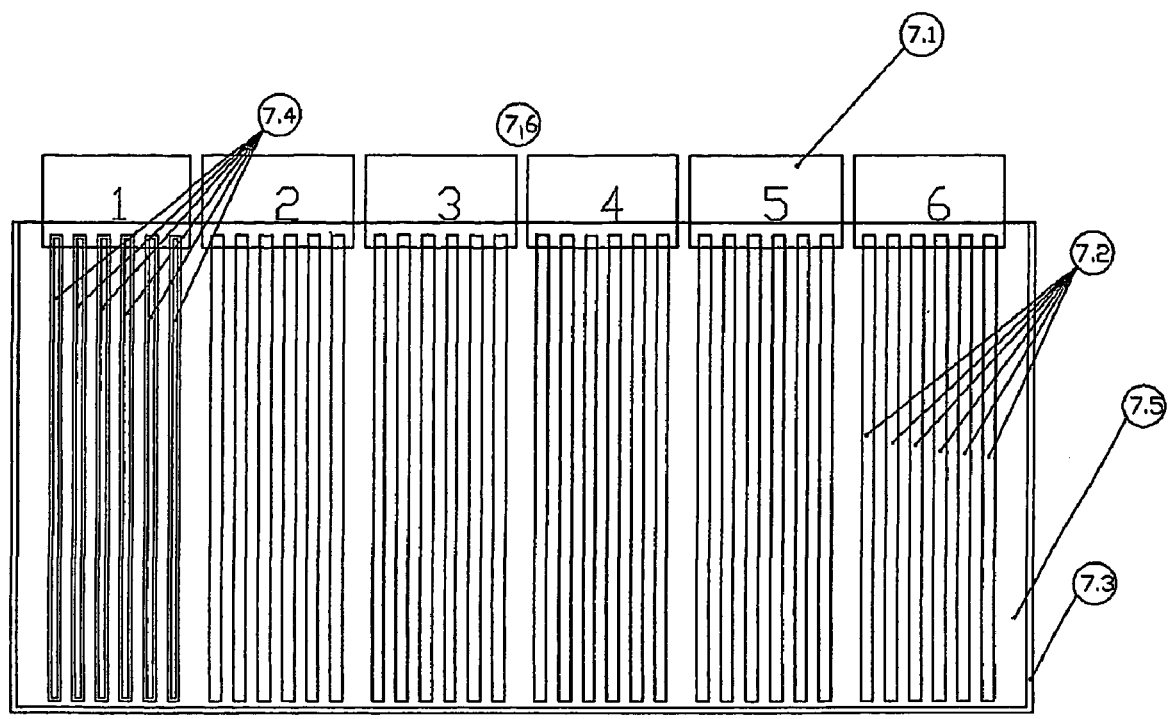
FIG. 7 shows an embodiment of the dispersion device for a combination weigher with its weighing hoppers arranged in a linear array.

In FIG. 7 is shown a possible construction of a base structure(7.5) in a dispersion device for a combination weigher (7.6) with the weighing hoppers in a linear array. This combination weigher has six pool hoppers (7.1) and six weighing hoppers (not shown on figure) underneath each of the pool hoppers. The protruding structures(7.4), which protrude through the slots (7.2) in the base structure (7.5) leading to each pool hopper, can be selectively activated to feed the hoppers which were emptied in the previous selection. Side guards(7.3) are mounted on three sides of the base structure(7.5) to avoid the product pile sitting on the base structure to fall off. The device could be equipped with a product sensor (not shown on drawing) to be able to measure the amount of product sitting on the base plate. The dispersion device can be driven with only one motor and have a sequence of shafts connected with a joints. Then there would be six actuators which could be selectively activated and thus pushed on a driving belt for each of the six separate protruding structures of the dispersion device in the same manner as shown on FIG. 5. Another option is to have individual driving mechanisms for each of the protruding structures.

The invention claimed is:

1. An in-feed control and dispersion apparatus for fresh food product industry wherein the apparatus receives product from an individual in-feed device and delivers the received product to at least one receiver unit, the apparatus comprising:
   a first product dispersion device,
   a weighing device operatively disposed proximate to the first product dispersion device to weigh the product,
   a second product dispersion device, arranged to receive the product from the first product dispersion device, wherein each first and second product dispersion device comprises a base structure having multiple through holes or slots, through which one or more associated moveable protruding structures extends and is moved in a cyclic motion so that a top surface of each protruding structure does not move lower than a bottom surface of the base structure.

2. An in-feed control and dispersion apparatus according to claim 1, further including:
   a product sensor disposed in the first product dispersion device.

3. An in-feed control and dispersion apparatus according to claim 1, wherein the weighing device includes a revolving drum scale disposed between the first and second product dispersion devices.

4. An in-feed control and dispersion apparatus according to claim 1, wherein at least one of the first or the second product dispersion device further includes:
   side supporting plates, mounted substantially perpendicular to of the base structure, proximate to longitudinal sides of the base structure, and extending away from the base structure, and
   a rear supporting plate mounted substantially perpendicular to the base structure, proximate to a back side of the base structure, and extending away from the base structure.

5. An in-feed control and dispersion apparatus according to claim, 4 wherein the first product dispersion device includes:
   a structure plate mounted substantially perpendicular to the base structure of the first product dispersion device at a front end, wherein the structure plate is fastened one of fixedly or moveably between the side supporting plates, and is one of vibrated, cyclically moved, or linked to the cyclic motion of the protruding structure.

6. An in-feed control and dispersion apparatus for the fresh food product industry, which apparatus receives product from an individual in-feed device and delivers the product to a combination weighing machine including hoppers to measure the product by weight and transfer the product out, the apparatus comprising:

dispersion devices each including a base structure having multiple through holes or slots, through which one or more moveable protruding structures extends and is moved in a cyclic motion so that a top surface of each protruding structure does not move lower than a bottom surface of the base structure.

7. An in-feed control and dispersion apparatus according to claim 6, wherein a number of the protruding structures is equal to a number of the hoppers and wherein the protruding structures operate on the same product pile, each protruding structure being selectively activated.

8. An in-feed control and dispersion apparatus according to claim 6, wherein by the multiple protruding structures are arranged in a circular array around a common axis.

9. An in-feed control and dispersion apparatus according to claim 6, wherein by the multiple protruding structures are arranged in a linear array in front of the hoppers.

10. An in-feed control and dispersion apparatus according to claim 7 further including:

driving mechanism to operate the multiple protruding structures, and actuators, each being in operational connection with the driving mechanism and associated with a corresponding protruding structure, which is to be selectively activated.

11. A method of in-feeding, controlling and dispersing of a product from an individual in-feed device and delivering the product at a predetermined throughput rate to a receiver unit in a field of fresh food product industry, by using the apparatus of claim 1, including:

controlling dispersing of the product from the in-feed device so that an amount of the product in the first product dispersion device is kept substantially the same;

delivering the product to the weighing device until a predetermined amount of product has entered the weighing device;

determining the amount of the product in the weighing device;

releasing the product into the second product dispersion device at a predetermined throughput rate; and dispersing the product from the second product dispersion device to the receiver unit.

12. A method according to claim 11, further including:

dynamically adjusting a speed of the second product dispersion device to obtain an optimum spread of the product when the product enters the receiver unit.

13. A method according to claim 11, wherein the apparatus further includes a third product dispersion device disposed sequentially to one of the first product dispersion device or the second product dispersion device and further including:

dispersing the product sequentially through two product dispersion devices one of before or after delivering the product to the weighing device.

14. A method according to claim 11, wherein the apparatus further includes a product sensor and further including:

measuring the amount of product in the first product dispersion device with the sensor.

* * * * *